(12) United States Patent
Wermuth et al.

(10) Patent No.: US 7,918,205 B2
(45) Date of Patent: Apr. 5, 2011

(54) METHOD AND APPARATUS TO CONTROL TRANSITION BETWEEN HCCI AND SI COMBUSTION IN A DIRECT-INJECTION GASOLINE ENGINE

(75) Inventors: Nicole Wermuth, Ann Arbor, MI (US); Tang-Wei Kuo, Troy, MI (US); Paul M. Najt, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 536 days.

(21) Appl. No.: 12/109,416

(22) Filed: Apr. 25, 2008

(65) Prior Publication Data

US 2008/0271688 A1     Nov. 6, 2008

Related U.S. Application Data

(60) Provisional application No. 60/915,140, filed on May 1, 2007.

(51) Int. Cl.
*F02D 13/00*     (2006.01)
*F02M 25/07*     (2006.01)

(52) U.S. Cl. ..................................... 123/295; 123/90.15

(58) Field of Classification Search .................. 123/295, 123/299, 305, 90.11, 90.15, 90.17, 443
See application file for complete search history.

(56) References Cited

U.S. PATENT DOCUMENTS

| | | | |
|---|---|---|---|
| 6,609,493 B2 | 8/2003 | Yamaguchi et al. | |
| 6,619,255 B2 | 9/2003 | Urushihara et al. | |
| 6,640,754 B1 | 11/2003 | Iida | |
| 6,662,785 B1 | 12/2003 | Sloane et al. | |
| 7,093,568 B2 | 8/2006 | Yang | |
| 7,128,047 B2 | 10/2006 | Kuo et al. | |
| 7,152,559 B2 | 12/2006 | Kuo et al. | |
| 7,156,070 B2 | 1/2007 | Strom et al. | |
| 7,168,396 B1 | 1/2007 | Bulicz et al. | |
| 7,275,514 B2 * | 10/2007 | Kuo et al. | 123/299 |
| 7,328,683 B2 * | 2/2008 | Weiss et al. | 123/295 |
| 7,370,616 B2 * | 5/2008 | Kuo et al. | 123/90.15 |
| 2006/0196466 A1 | 9/2006 | Kuo et al. | |
| 2006/0243241 A1 | 11/2006 | Kuo et al. | |
| 2007/0272202 A1 | 11/2007 | Kuo et al. | |

FOREIGN PATENT DOCUMENTS

WO    WO2006/032886 A2    3/2006

OTHER PUBLICATIONS

Herrmann, H., Control Concepts in Gasoline Engines with Homogeneous Charge Compression Combustion, Congress,, Haus der Technik Controlled Auto Ignition, Oct. 20-21, 2005, Essen, Germany.

Hiraya, K., A Study on Gasoline Fueled Compression Ignition Engine~A Trial of Operation Region Expansion, SAE 2002-01-0416, Mar. 4-7, 2002, Detroit, Michigan.

(Continued)

*Primary Examiner* — Hieu T Vo

(57) ABSTRACT

A method for transitioning operation of a spark-ignition, direct-injection internal combustion engine having a two-step, variable phase valvetrain between HCCI and SI modes includes providing a low-lift intake valve, un-throttled stoichiometric SI operation intermediate a low-lift exhaust and intake valve HCCI mode and a high-lift exhaust and intake valve, un-throttled SI mode.

16 Claims, 5 Drawing Sheets

OTHER PUBLICATIONS

Urushihara, T., Expansion of HCCI Operating Region by the Combination of Direct Fuel Injection, Negative Valve Overlap and Internal Fuel Reformation, SAE 2003-01-0749, Mar. 3-6, 2003, Detroit, Michigan.

Urushihara, T., A Study of a Gasoline-fueled Compression Ignition Engine~Expansion of HCCI Operation Range Using SI Combustion as a Trigger of Compression Ignition, SAE 2005-01-0180, Apr. 11-14, 2005, Detroit, Michigan.

Fuerhapter, A., The new AVL CSI Engine—HCCI Operation on a Multi Cylinder Gasoline Engine, SAE 2004-01-0551, Mar. 8-11, 2004, Detroit, Michigan.

* cited by examiner

METHOD AND APPARATUS TO CONTROL TRANSITION BETWEEN HCCI AND SI COMBUSTION IN A DIRECT-INJECTION GASOLINE ENGINE

CROSS REFERENCE TO RELATED APPLICATIONS

This application claims the benefit of U.S. Provisional Application No. 60/915,140 filed on May 1, 2007 which is hereby incorporated herein by reference.

TECHNICAL FIELD

This invention pertains generally to internal combustion engine control systems.

BACKGROUND

The statements in this section merely provide background information related to the present disclosure and may not constitute prior art.

One engine system being developed for controlled auto-ignition combustion operation comprises an internal combustion engine designed to operate under an Otto cycle. The engine, equipped with direct in-cylinder fuel-injection, operates in a controlled auto-ignition mode under specific engine operating conditions to achieve improved engine fuel efficiency. A spark ignition system is employed to supplement the auto-ignition combustion process during specific operating conditions. Such engines are referred to as Homogeneous Charge Compression Ignition (hereinafter 'HCCI') engines.

An HCCI engine operating in HCCI combustion mode creates a charge mixture of combusted gases, air, and fuel in a combustion chamber, and auto-ignition is initiated simultaneously from many ignition sites within the charge mixture during a compression stroke, resulting in stable power output, high thermal efficiency and low emissions. The combustion is highly diluted and uniformly distributed throughout the charge mixture, resulting in low burnt gas temperature and NOx emissions typically substantially lower than NOx emissions of either a traditional spark ignition engine, or a traditional diesel engine.

A typical HCCI engine is distinguishable from a conventional spark-ignition engine in that ignition of the charge mixture is caused by compression of the charge mixture under specific engine operating conditions. The typical HCCI engine transitions between HCCI combustion mode and spark-ignition combustion mode, depending upon predetermined operating conditions.

Applicants have successfully demonstrated smooth transition control between HCCI and SI/NTLC (SI with Non-Throttled Load Control) combustion modes utilizing dual independent, 2-step, cam profile switching mechanisms. In particular, transition from HCCI to SI/NTLC operation may be realized by cam phasing of low lift intake cams with Early Intake Valve Closing (EIVC) in conjunction with profile switching from low lift HCCI to high lift SI exhaust cam profiles. SI/NTLC engine operation is also possible using cam phasing of high lift SI intake cam with Late Intake Valve Closing (LIVC) if simultaneous switching of both intake and exhaust cam profiles between low lift HCCI and high lift SI cams is mandated.

However, depending on the lift and duration used for both the HCCI and SI cams and cam phaser authority and slew speed, smooth transition between HCCI and SI/NTLC combustion mode may be impossible beyond certain engine speed. In particular, a gap exists between the highest load reachable with HCCI operation and the lowest load reachable with SI/NTLC operation above a certain engine speed. FIG. 2, for example, illustrates an engine speed limit of substantially 2000 rpm if 4 mm peak lift and 120 degree duration intake and exhaust HCCI valve lift profiles and typical 10 mm peak lift and 240-260 degree duration intake and exhaust SI valve lift profiles are used, respectively. The highest load reachable with HCCI operation is limited by ringing (ringing limit=3 MW/m2) while the lowest load reachable with SI/NTLC operation is limited by combustion stability (COV of IMEP=3%). The HCCI ringing limit results from an inability to induct sufficient charge dilution with the prescribed low lift cams. The SI combustion stability limit results from excessive charge dilution with the prescribed high lift cams. Applicants have successfully demonstrated that selective cylinder deactivation by fuel cutoff may be employed to extend the engine low load operating limit in SI combustion mode by allowing stable operation of the active cylinders. Alternatively, it is believed that more complex cam profile switching mechanisms (e.g. three-step cam profiles) or continuously variable valvetrains could successfully be employed to extend both the high load HCCI and low load SI operating limits and close the gap between HCCI and SI operations (e.g. through intermediate lift and duration). However, an alternative utilizing the less complex 2-step, cam profile switching mechanisms and without additional cylinder deactivation hardware is desirable.

SUMMARY

A method for transitioning operation of a spark-ignition, direct-injection internal combustion engine having a two-step, variable phase valvetrain between HCCI and SI modes includes providing a low-lift intake valve, un-throttled stoichiometric SI operation intermediate a low-lift exhaust and intake valve HCCI mode and a high-lift exhaust and intake valve, un-throttled SI mode.

BRIEF DESCRIPTION OF THE DRAWINGS

One or more embodiments will now be described, by way of example, with reference to the accompanying drawings, in which.

DETAILED DESCRIPTION

Figure 1:
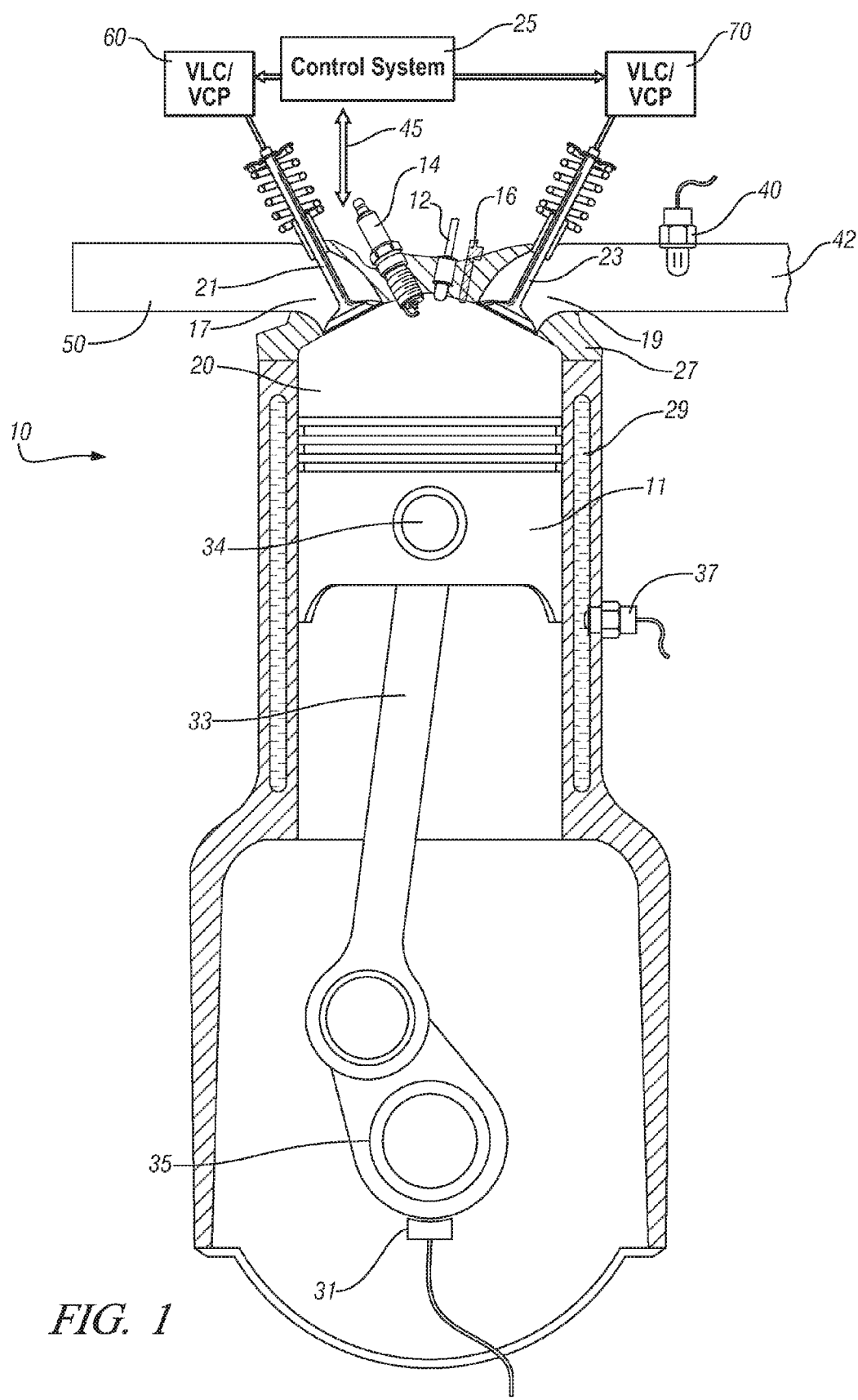
FIG. 1 is a schematic illustration of an internal combustion engine, in accordance with the present disclosure.

Referring now to the drawings, wherein the showings are for the purpose of illustrating certain exemplary embodiments only and not for the purpose of limiting the same, FIG. 1 shows a schematic of an internal combustion engine 10 and control system 25 which has been constructed in accordance with an embodiment of the present invention. The embodiment as shown is applied as part of an overall control scheme to operate an exemplary multi-cylinder dual overhead cam, spark ignition, direct-injection, gasoline, four-stroke internal combustion engine adapted to operate under a controlled auto-ignition process, also referred to as homogenous-charge, compression-ignition ('HCCI') mode.

The exemplary engine 10 comprises: a cast-metal engine block with a plurality of cylinders formed therein, one of which is shown, and an engine head 27. Each cylinder comprises a closed-end cylinder having a moveable, reciprocating piston 11 inserted therein. A variable volume combustion chamber 20 is formed in each cylinder, and is defined by walls of the cylinder, the moveable piston 11, and the head 27. The engine block preferably includes coolant passages 29 through which engine coolant fluid passes. A coolant temperature sensor 37, operable to monitor temperature of the coolant fluid, is located at an appropriate location, and provides a parametric signal input to the control system 25 useable to control the engine. The engine preferably includes known systems including an external exhaust gas recirculation ('EGR') valve and an intake air throttle valve (not shown).

Each moveable piston 11 comprises a device designed in accordance with known piston forming methods, and includes a top and a body which conforms substantially to the cylinder in which it operates. The piston has top or crown area that is exposed in the combustion chamber. Each piston is connected via a pin 34 and connecting rod 33 to a crankshaft 35. The crankshaft 35 is rotatably attached to the engine block at a main bearing area near a bottom portion of the engine block, such that the crankshaft is able to rotate around an axis that is perpendicular to a longitudinal axis defined by each cylinder. A crank sensor 31 is placed in an appropriate location, operable to generate a signal that is useable by the controller 25 to measure crank angle, and which is translatable to provide measures of crankshaft rotation, speed, and acceleration that are useable in various control schemes. During operation of the engine, each piston 11 moves up and down in the cylinder in a reciprocating fashion due to connection to and rotation of the crankshaft 35, and the combustion process. The rotation action of the crankshaft effects translation of linear force exerted on each piston during combustion to an angular torque output from the crankshaft, which can be transmitted to another device, e.g. a vehicle driveline.

The engine head 27 comprises a cast-metal device having one or more intake ports 17 and one or more exhaust ports 19 which flow to the combustion chamber 20. An intake port throttle may also be employed usefully in certain preferred embodiments as described further herein below. The intake port 17 supplies air to the combustion chamber 20. Combusted (burned) gases flow from the combustion chamber 20 via exhaust port 19. Flow of air through each intake port is controlled by actuation of one or more intake valves (IV) 21. Flow of combusted gases through each exhaust port is controlled by actuation of one or more exhaust valves (EV) 23.

The intake and exhaust valves 21, 23 each have a head portion that includes a top portion that is exposed to the combustion chamber. Each of the valves 21, 23 has a stem that is connected to a valve actuation device. A valve actuation device, depicted as 60, is operative to control opening and closing of each of the intake valves 21, and a second valve actuation device 70 operative to control opening and closing of each of the exhaust valves 23. Each of the valve actuation devices 60, 70 comprises a device signally connected to the control system 25 and operative to control timing, duration, and magnitude of opening and closing of each valve, either in concert or individually. The first embodiment of the exemplary engine comprises a dual overhead cam system which has variable lift control ('VLC') and variable cam phasing ('VCP'). The VCP device is operative to control timing of opening or closing of each intake valve and each exhaust valve relative to rotational position of the crankshaft and opens each valve for a fixed crank angle duration. The exemplary VLC device is operative to control magnitude of valve lift to one of two positions, one position to a magnitude of 3-5 mm lift for an open duration of 120-150 crank angle degrees, and one position to a magnitude of 9-12 mm lift for an open duration of 220-260 crank angle degrees. Individual valve actuation devices can serve the same function to the same effect. The valve actuation devices are preferably controlled by the control system 25 according to predetermined control schemes. A specific aspect of a control scheme to control opening and closing of the valves is described herein.

Air is inlet to the intake port 17 through an intake manifold runner 50, which receives filtered air passing through a known air metering device and a throttle device (not shown). Exhaust gas passes from the exhaust port 19 to an exhaust manifold 42, which includes exhaust gas sensors 40 operative to monitor constituents of the exhaust gas feedstream, and determine parameters associated therewith. The exhaust gas sensor 40 can comprise any one of several known sensing devices operative to provide parametric values for the exhaust gas feedstream, including air/fuel ratio, or measurement of exhaust gas constituents, e.g. NOx, CO, HC, and others. The system may include an in-cylinder sensor 16 from monitoring combustion pressures. The aforementioned sensors and metering devices each provide a signal as a parametric input to the control system 25. These parametric inputs can be used by the control system to determine combustion performance measurements.

The control system 25 preferably comprises a subset of an overall control architecture operable to provide coordinated system control of the engine 10 and other systems. In overall operation, the control system 25 is operable to synthesize operator inputs, ambient conditions, engine operating parameters, and combustion performance measurements, and execute algorithms to control various actuators to achieve targets for control parameters, including such parameters as fuel economy, emissions, performance, and, driveability. The control system 25 is operably connected to a plurality of devices through which an operator typically controls or directs operation of the engine. Exemplary operator inputs include an accelerator pedal, a brake pedal, transmission gear selector, and, vehicle speed cruise control when the engine is employed in a vehicle. The control system may communicate with other controllers, sensors, and actuators via a local area network ('LAN') bus (not shown) which preferably allows for structured communication of control parameters and commands between various controllers.

The control system 25 is operably connected to the engine 10, and functions to acquire parametric data from sensors, and control a variety of actuators, respectively, of the engine 10 over a plurality of discrete lines collectively shown as aggregate line 45. The control system 25 receives an engine torque command, and generates a desired torque output, based upon the operator inputs. Engine operating parameters that are typically sensed by control system 25 using the aforementioned sensors include engine coolant temperature, crankshaft rotational speed ('RPM') and position, manifold absolute pressure, ambient air flow and temperature, and, ambient air pressure. Combustion performance measurements typically comprise measured and inferred combustion parameters, including air/fuel ratio, location of peak combustion pressure, amongst others.

Actuators controlled by the control system 25 include: fuel injectors 12; the VCP/VLC valve actuation devices 60, 70; spark plug 14 operably connected to ignition modules for controlling spark dwell and timing; exhaust gas recirculation (EGR) valve (not shown), and, electronic throttle control module (not shown). Fuel injector 12 is preferably operable to inject fuel directly into each combustion chamber 20. Specific details of exemplary direct injection fuel injectors are known and not detailed herein. Spark plug 14 is employed by the control system 25 to enhance ignition timing control of the exemplary engine across portions of the engine speed and load operating range. When the exemplary engine is operated in the HCCI mode, the engine does not utilize an energized spark plug. It has proven desirable to employ spark ignition to complement the HCCI mode under certain conditions, including, e.g. during cold start, at low load operating conditions near a low-load limit, and to prevent fouling. Also, it has proven preferable to employ spark ignition at a high load operation limit in the HCCI mode, and at high speed/load operating conditions under throttled or un-throttled spark-ignition operation.

The control system 25 preferably includes a cylinder deactivation system operative to selectively deactivate a subset of the total number of cylinders. A cylinder deactivation mode in this embodiment comprises discontinuing fuel flow to the deactivated cylinders during the period of deactivation. The cylinder deactivation mode may include disabling opening of the intake and/or exhaust valves concurrent with discontinuing fuel flow to specific cylinders. The control system meets the engine torque command by increasing torque output from the activated cylinders during the period of time when the cylinder deactivation mode is enabled.

The control system 25 preferably comprises a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer.

Algorithms for engine control are typically executed during preset loop cycles such that each algorithm is executed at least once each loop cycle. Algorithms stored in the non-volatile memory devices are executed by the central processing unit and are operable to monitor inputs from the sensing devices and execute control and diagnostic routines to control operation of the engine, using preset calibrations. Loop cycles are typically executed at regular intervals, for example each 3.125, 6.25, 12.5, 25 and 100 milliseconds during ongoing engine operation. Alternatively, algorithms may be executed in response to occurrence of an event.

Figure 2:
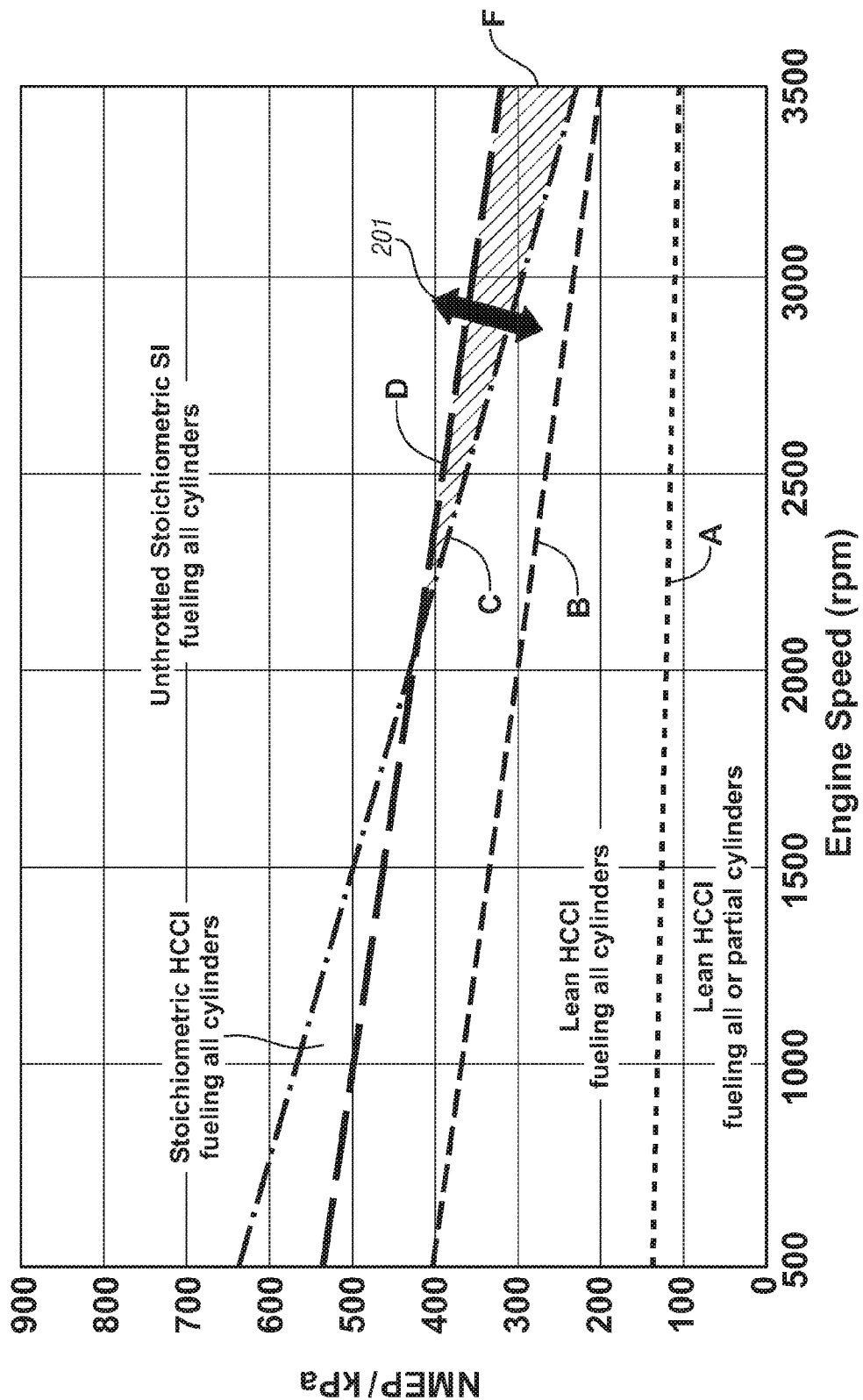
FIG. 2 is a graphic depiction of various operating regions of an exemplary direct-injection internal combustion engine in accordance with the present disclosure.

Referring now to FIG. 2, a graphic depiction of areas of engine operation under various conditions is shown for the exemplary dual overhead cam engine with variable valve actuation system having dual cam phasers and 2-step lifter system. The exemplary engine is operative in HCCI mode, over a range of engine speeds, in revolutions per minute ('rpm') and load, in net mean effective pressure units of kilopascals ('NMEP (kPa)'). Line A depicts a lower limit for operating the engine in lean HCCI mode, below which one or more of the cylinders are unfueled, which is a low speed/low load operating condition. In such an exemplary configuration, a determination is made regarding the load on the engine and/or the load on individual cylinders and engine speed, and an algorithm cuts fuels to and implements certain valve strategies in order to optimally deactivate selected cylinders. By only utilizing a portion of the cylinders, the load under which the remaining operating cylinders operate is increased, enabling HCCI operation at a lower overall engine load. Under this configuration, engine load is continued to be monitored, and cylinders are reactivated as appropriate depending upon engine load and speed. Line B depicts an upper limit for operating the engine in lean HCCI mode with all cylinders fueled. Line C depicts an upper limit for operating the engine in a stoichiometric HCCI mode with all cylinders fueled. Line D depicts a lower limit for operating the engine in an unthrottled stoichiometric spark-ignition mode ('SI') with all cylinders fueled. Line D is typically determined based upon engine combustion stability as measured by coefficient of variability of mean effective pressure ('COV-IMEP'). There can be an upper limit for operating the engine in the SI-NTLC mode, above which the engine is preferably operated in a throttled stoichiometric SI mode (not shown). The shaded area depicted by the letter F comprises an area in which the engine is incapable of acceptably operating in HCCI mode and incapable of acceptably operating in SI ('Spark-Ignition') mode on all cylinders. The SI mode comprises operating by controlling the cam phasers to adjust valve opening/closing timings such that the amount of air induction is controlled without throttling in the air intake system. This, coupled with direct in-cylinder fuel injection, gives a load control mechanism similar to that used in diesel engines.

Depending on specific valve lift and duration employed for the intake and exhaust camshafts of the exemplary HCCI engine, there is a need for a smooth transition 201 between the HCCI mode and the SI mode when operating the engine around and through the engine speed range of 3000 rpm, particularly in the region identified on FIG. 2 by the letter F. In particular, a gap exists between the highest load reachable in the HCCI mode and the lowest load reachable with SI operation above an engine speed of about 2000 rpm (see e.g. FIG. 2) if a 2-step valve lift system is used. The highest load attainable in the HCCI mode is limited by ringing (combustion generated noise). The lowest attainable load with SI operation is limited by combustion stability (COV–IMEP=3%). The HCCI ringing limit results from an inability to induct sufficient charge dilution with the prescribed low lift cams. The SI limit results from excessive charge dilution with the prescribed high lift cams.

Figure 3:
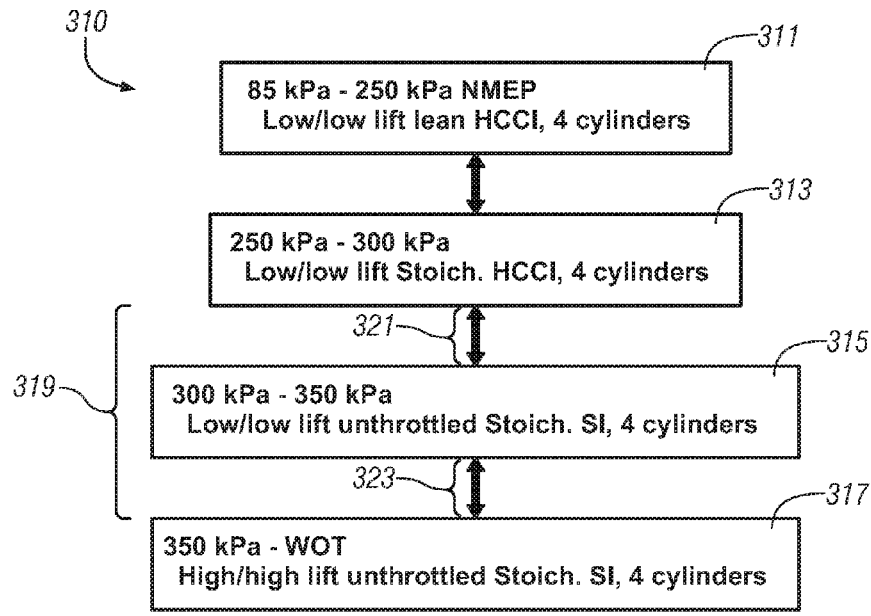
FIG. 3 is a first exemplary operation for effecting smooth transitions between HCCI and SI modes in accordance with the present disclosure.
Figure 4:
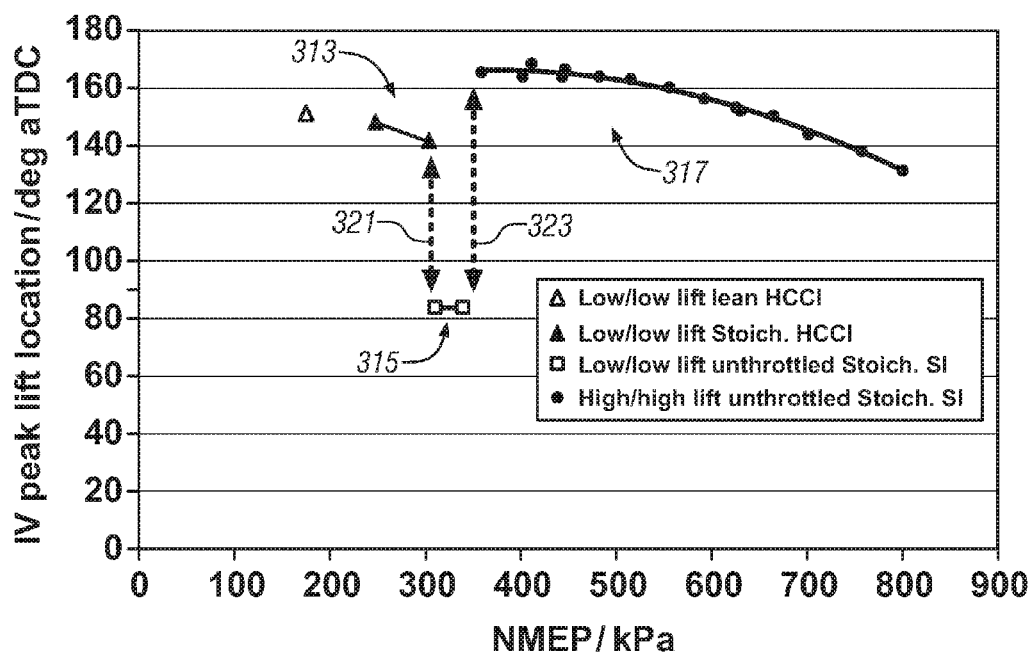
FIG. 4 is a data graph representing exemplary peak intake valve lift across transitions between HCCI and SI modes in accordance with the first exemplary operation of FIG. 3 and in accordance with the present disclosure.
Figure 5:
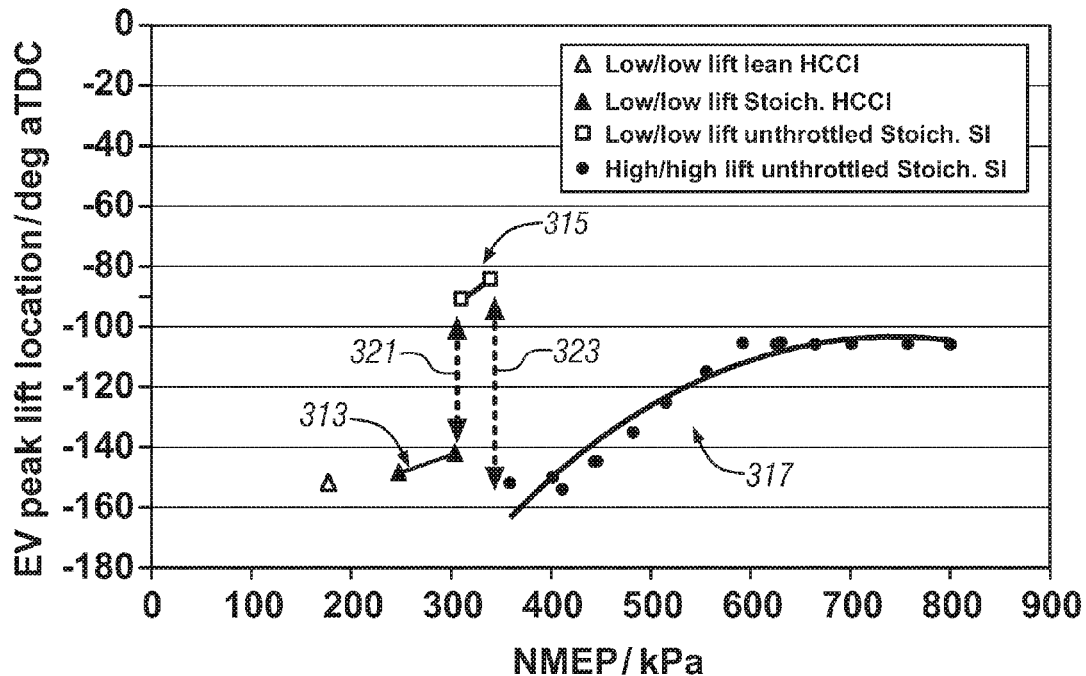
FIG. 5 is a data graph representing exemplary peak exhaust valve lift across transitions between HCCI and SI modes in accordance with the first exemplary operation of FIG. 3 in accordance with the present disclosure.

Therefore, in order to bridge the gap between HCCI operation with the prescribed low lift cams and SI operation with the prescribed high lift cams using a 2-step CPS mechanism, and with further reference now to FIGS. 3-5, in accordance with one embodiment, operated in at an exemplary engine speed of 3000 rpm, transition is controlled between lean or stoichiometric HCCI operation (low EV & low IV lift) 311, 313 to un-throttled stoichiometric SI operation (low EV & low IV lift) 315 and to un-throttled stoichiometric SI operation (high EV & high IV lift) 317. FIGS. 4 and 5 show the peak lift location of the intake and exhaust valves, respectively, at different engine load conditions. Together, they illustrate one embodiment in an engine having multiple intake ports per cylinder, at least one of which has an associated intake port throttle which is actuated during un-throttled stoichiometric SI operation (low EV & low IV lift) 315.

When transitioning from the stoichiometric HCCI operation (low EV & low IV lift) 313 to the un-throttled stoichiometric SI operation (low EV & low IV lift) 315 the peak lift location of the opened intake valve needs to be changed by more than 50 CAD to reduce the airflow through the intake valve sufficiently to enable un-throttled stoichiometric engine operation. If this strategy is used in a transient engine operation, a fast cam phasing/valve timing mechanism is necessary. For the transition from un-throttled stoichiometric SI operation (low EV & low IV lift) 315 to un-throttled stoichiometric SI operation (high EV & high IV lift) 317, the peak intake valve lift location needs to be changed by around 80 CAD in addition to an increase in peak valve lift. The intake port throttle allows for effectively restricting airflow through the associated intake valve regardless of the valve's actuation and allows for smaller phase changes of the intake cams to effect equivalent effects. Therefore, reduced authority range cam phasing hardware may be employed when coupled with intake port throttling and smaller dynamic range and slew rates of the cam phasing hardware may be required to effect an equivalent intake air control. In other words and as illustrated in FIG. 4, whereas a dual intake port/valve with one intake port throttle complement required a cam phase change of substantially 60 degrees to effect transition from stoichiometric HCCI operation (low EV & low IV lift) 313 to un-throttled stoichiometric SI operation (low EV & low IV lift) 315, such a dual intake valve arrangement without an intake port throttle would require a larger phase change to effect an acceptable transition to and operation within the un-throttled stoichiometric SI operation (low EV & low IV lift) 315. And, given that the un-throttled stoichiometric SI operation (high EV & high IV lift) 317 exhibits even greater crank angle separation between the EV and the IV peak lifts than does the stoichiometric HCCI operation (low EV & low IV lift) 313 at least at the respective transitions (321, 323), the benefits to transition from un-throttled stoichiometric SI operation (low EV & low IV lift) 315 to un-throttled stoichiometric SI operation (high EV & high IV lift) 317 of smaller cam phase changes afforded by multiple intake ports per cylinder, at least one of which has an associated intake port throttle which is actuated during un-throttled stoichiometric SI operation (low EV & low IV lift) 315 are even more acute.

When transitioning from the stoichiometric HCCI operation (low EV & low IV lift) 313 to the un-throttled stoichiometric SI operation (low EV & low IV lift) 315 the peak lift location of the exhaust valve(s) is changed by more than 40 CAD to reduce the internal residual level enough to facilitate flame propagation. For the transition from un-throttled stoichiometric SI operation (low EV & low IV lift) 315 to un-throttled stoichiometric SI operation (high EV & high IV lift) 317 the peak exhaust valve lift location is changed by around 70 CAD in addition to an increase in peak valve lift.

If two intake valves instead of one are effective (i.e. no intake port throttling) or if a different peak valve lift or opening durations are used, the shown curves for the peak lift location of intake and exhaust valves will shift but the presented trends will stay the same.

Figure 6:
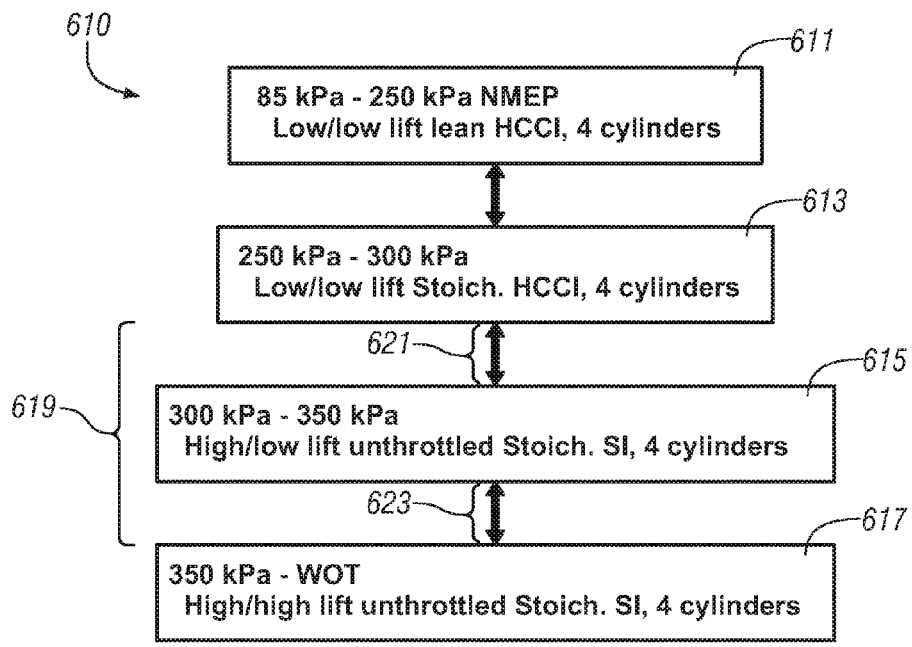
FIG. 6 is a second exemplary operation for effecting smooth transitions between HCCI and SI modes in accordance with the present disclosure.
Figure 7:
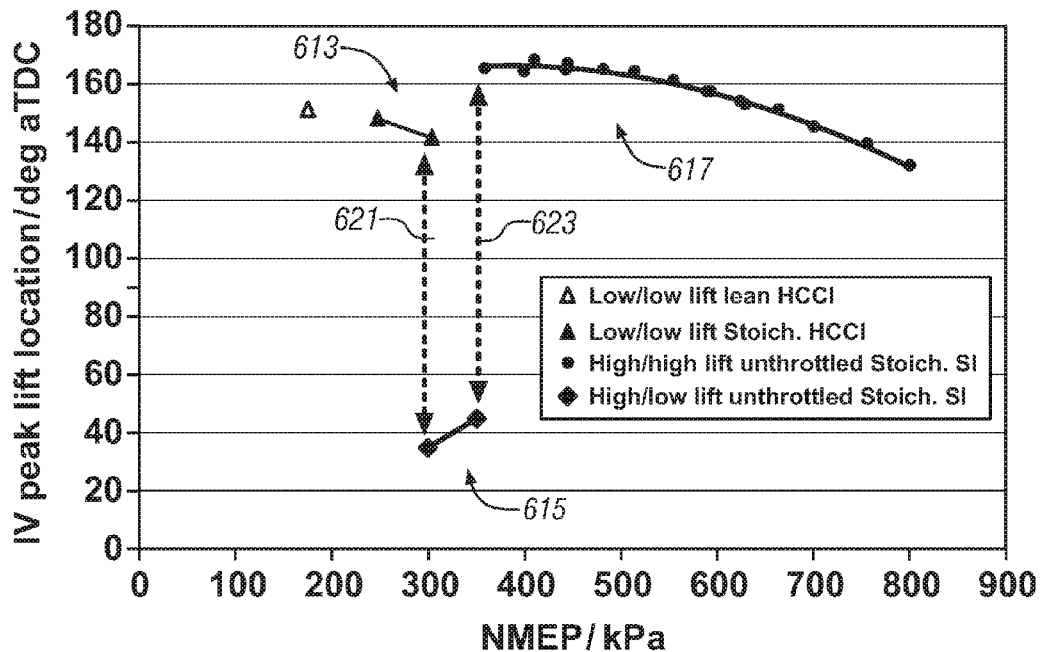
FIG. 7 is a data graph representing exemplary peak intake valve lift across transitions between HCCI and SI modes in accordance with the second exemplary operation of FIG. 6 in accordance with the present disclosure.
Figure 8:
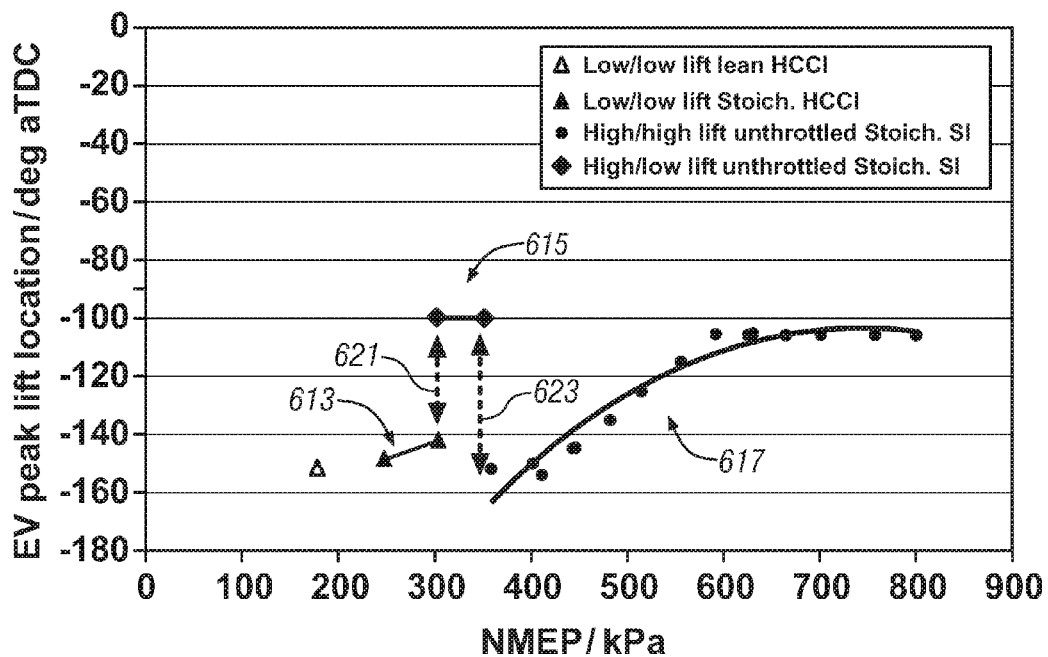
FIG. 8 is a data graph representing exemplary peak exhaust valve lift across transitions between HCCI and SI modes in accordance with the second exemplary operation of FIG. 6 and in accordance with the present disclosure.

In accordance with another embodiment, in order to bridge the gap between HCCI operation with the prescribed low lift cams and SI operation with the prescribed high lift cams using a 2-step CPS mechanism, and with further reference now to FIGS. 6-8, the present exemplary embodiment operated in at an exemplary engine speed of 3000 rpm, transition is controlled between lean or stoichiometric HCCI operation (low EV & low IV lift) 611, 613 to un-throttled stoichiometric SI operation (high EV & low IV lift) 615 and to un-throttled stoichiometric SI operation (high EV & high IV lift) 617. FIGS. 7 and 8 show the peak lift location of the intake and exhaust valves, respectively, at different engine load conditions. Together, they illustrate an embodiment in an engine without intake port throttling during un-throttled stoichiometric SI operation (high EV & low IV lift) 615.

When transitioning from the stoichiometric HCCI operation (low EV & low IV lift) 613 to the un-throttled stoichiometric SI operation (high EV & low IV lift) 615 the peak lift location of the opened intake valve needs to be changed by about 100 CAD to reduce the airflow through the intake valves sufficiently to enable un-throttled stoichiometric engine operation. If this strategy is used in a transient engine operation, a fast cam phasing/valve timing mechanism is necessary. For the transition from un-throttled stoichiometric SI operation (high EV & low IV lift) 615 to un-throttled stoichiometric SI operation (high EV & high IV lift) 617, the peak intake valve lift location needs to be changed by more than 100 CAD in addition to an increase in peak valve lift.

Inclusion of an intake port throttle would allow for effectively restricting airflow through the associated intake valve regardless of the valve's actuation and would enable use of smaller phase changes of the intake cams to effect equivalent effects. Therefore, reduced authority range cam phasing hardware could be employed when coupled with intake port throttling and smaller dynamic range and slew rates of the cam phasing hardware advantageously could be employed to effect an equivalent intake air control. In other words and as illustrated in FIG. 7, whereas a dual intake complement without intake port throttling required a cam phase change of substantially 100 CAD to effect transition from stoichiometric HCCI operation (low EV & low IV lift) 613 to un-throttled stoichiometric SI operation (low EV & low IV lift) 615, such a dual intake valve arrangement with an intake port throttle would require a smaller phase change to effect an acceptable transition to and operation within the un-throttled stoichiometric SI operation (low EV & low IV lift) 615. And, given that the un-throttled stoichiometric SI operation (high EV & high IV lift) 617 exhibits even greater crank angle separation between the EV and the IV peak lifts than does the stoichiometric HCCI operation (low EV & low IV lift) 613 at least at the respective transitions (621, 623), the benefits to transition from un-throttled stoichiometric SI operation (low EV & low EV lift) 315 to un-throttled stoichiometric SI operation (high IV & high IV lift) 617 of smaller cam phase changes afforded by multiple intake ports per cylinder, at least one of which has an associated intake port throttle which is actuated during un-throttled stoichiometric SI operation (low EV & low IV lift) 615 are even more acute.

When transitioning from the stoichiometric HCCI operation (low EV & low IV lift) 613 to the un-throttled stoichiometric SI operation (high EV & low IV lift) 615 the peak lift location of the exhaust valve(s) is changed by about 40 CAD to reduce the internal residual level enough to facilitate flame propagation. Additionally, this phase change is accompanied by a change in exhaust valve lift from low to high. For the transition from un-throttled stoichiometric SI operation (high EV & low IV lift) 615 to un-throttled stoichiometric SI operation (high EV & high IV lift) 617 the peak exhaust valve lift location is changed by around 50 CAD.

If one intake valve instead of two are effective (i.e. intake port throttling) or if a different peak valve lift or opening durations are used, the shown curves for the peak lift location of intake and exhaust valves will shift but the presented trends will stay the same.

If different peak valve lift and/or opening duration are used for both high and low lift cams, the peak lift locations of intake and exhaust valves presented in FIGS. 4, 5, 7 and 8 will vary but the trends and employed transition strategies remain the same.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for transitioning operation of a spark-ignition, direct-injection internal combustion engine having a two-step, variable phase valvetrain between homogeneous charge compression ignition mode and spark ignition modes, comprising:
providing a low-lift intake valve, un-throttled stoichiometric spark ignition operation intermediate a low-lift exhaust and intake valve homogeneous charge compression ignition mode and a high-lift exhaust and intake valve, un-throttled spark ignition mode.

2. The method for transitioning operation of a spark-ignition, direct-injection internal combustion engine having a two-step, variable phase valvetrain between homogeneous charge compression ignition and spark ignition modes as claimed in claim 1, wherein said intermediate low-lift intake valve, un-throttled stoichiometric spark ignition operation further comprises low-lift exhaust valve, un-throttled stoichiometric spark ignition operation.

3. The method for transitioning operation of a spark-ignition, direct-injection internal combustion engine having a two-step, variable phase valvetrain between homogeneous charge compression ignition and spark ignition modes as claimed in claim 2, wherein said engine comprises a single intake port per cylinder.

4. The method for transitioning operation of a spark-ignition, direct-injection internal combustion engine having a two-step, variable phase valvetrain between homogeneous charge compression ignition and spark ignition modes as claimed in claim 2, wherein said engine comprises multiple intake ports per cylinder.

5. The method for transitioning operation of a spark-ignition, direct-injection internal combustion engine having a two-step, variable phase valvetrain between homogeneous charge compression ignition and spark ignition modes as claimed in claim 4, wherein at least one intake port includes an intake port throttle.

6. The method for transitioning operation of a spark-ignition, direct-injection internal combustion engine having a two-step, variable phase valvetrain between homogeneous charge compression ignition and spark ignition modes as claimed in claim 1, wherein said intermediate low-lift intake valve, un-throttled stoichiometric spark ignition operation further comprises high-lift exhaust valve, un-throttled stoichiometric spark ignition operation.

7. The method for transitioning operation of a spark-ignition, direct-injection internal combustion engine having a two-step, variable phase valvetrain between homogeneous charge compression ignition and spark ignition modes as claimed in claim 6, wherein said engine comprises a single intake port per cylinder.

8. The method for transitioning operation of a spark-ignition, direct-injection internal combustion engine having a two-step, variable phase valvetrain between homogeneous charge compression ignition and spark ignition modes as claimed in claim 6, wherein said engine comprises multiple intake ports per cylinder.

9. The method for transitioning operation of a spark-ignition, direct-injection internal combustion engine having a two-step, variable phase valvetrain between homogeneous charge compression ignition and spark ignition modes as claimed in claim 8, wherein at least one intake port includes an intake port throttle.

10. The method for transitioning operation of a spark-ignition, direct-injection internal combustion engine having a two-step, variable phase valvetrain between homogeneous charge compression ignition and spark ignition modes as claimed in claim 1, wherein said engine comprises a fast cam phasing/valve timing mechanism in order to facilitate said intermediate operation in transient engine operation.

11. Method for transitioning operation of a spark-ignition, direct-injection internal combustion engine having a two-step, variable phase valvetrain between homogeneous charge compression ignition and spark ignition modes, wherein a gap exists between a highest load reachable with said homogeneous charge compression ignition mode and a lowest load reachable with said spark ignition mode above a threshold engine speed, comprising:
when said engine is operating above said threshold engine speed, providing a low-lift intake valve, low-lift exhaust valve, un-throttled stoichiometric spark ignition operation intermediate a low-lift exhaust and intake valve homogeneous charge compression ignition mode and a high-lift exhaust and intake valve, un-throttled spark ignition mode.

12. The method for transitioning operation of a spark-ignition, direct-injection internal combustion engine having a two-step, variable phase valvetrain between homogeneous charge compression ignition and spark ignition modes as claimed in claim 11, wherein said engine comprises multiple intake ports per cylinder.

13. The method for transitioning operation of a spark-ignition, direct-injection internal combustion engine having a two-step, variable phase valvetrain between homogeneous charge compression ignition and spark ignition modes as claimed in claim 12, wherein at least one intake port includes an intake port throttle.

14. The method for transitioning operation of a spark-ignition, direct-injection internal combustion engine having a two-step, variable phase valvetrain between homogeneous charge compression ignition and spark ignition modes as claimed in claim 12, wherein at least one intake port includes an intake port throttle.

15. The method for transitioning operation of a spark-ignition, direct-injection internal combustion engine having a two-step, variable phase valvetrain between homogeneous charge compression ignition and spark ignition modes as claimed in claim 11, wherein said engine comprises multiple intake ports per cylinder.

16. Method for transitioning operation of a spark-ignition, direct-injection internal combustion engine having a two-step, variable phase valvetrain between homogeneous charge compression ignition and spark ignition modes, wherein a gap exists between a highest load reachable with said homogeneous charge compression ignition mode and a lowest load reachable with said spark ignition mode above a threshold engine speed, comprising:

when said engine is operating above said threshold engine speed, providing a low-lift intake valve, high-lift exhaust valve, un-throttled stoichiometric spark ignition operation intermediate a low-lift exhaust and intake valve homogeneous charge compression ignition mode and a high-lift exhaust and intake valve, un-throttled spark ignition mode.

\* \* \* \* \*